F. J. GLEASON.
BRAKE LINING.
APPLICATION FILED AUG. 1, 1918.
1,342,043.
Patented June 1, 1920.
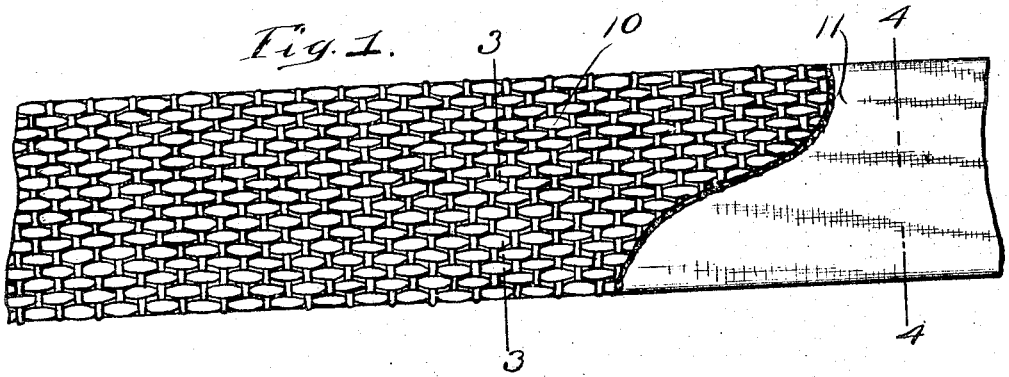
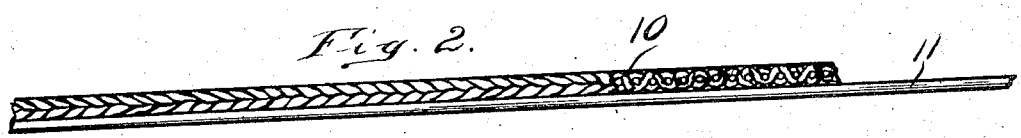
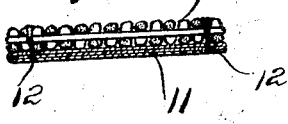 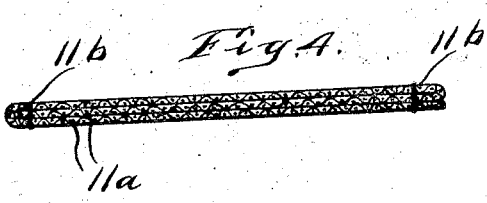
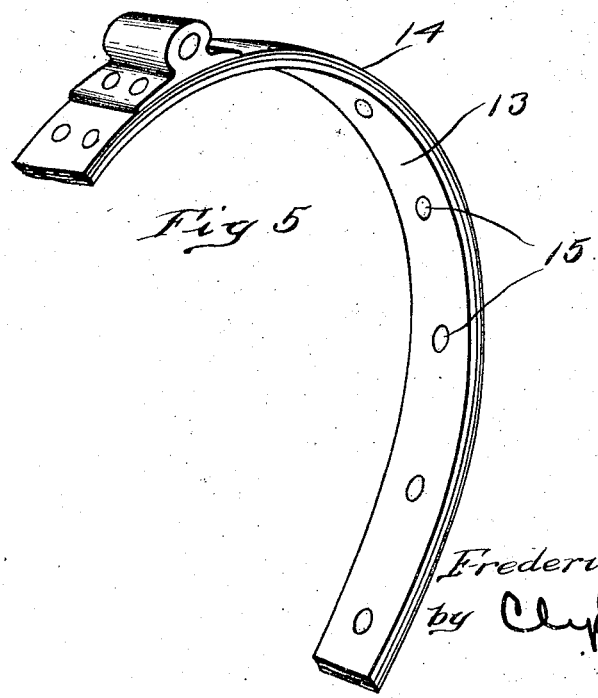
Inventor:
Frederick J. Gleason
by Clyde L. Rogers
his Att'y.

UNITED STATES PATENT OFFICE.

FREDERICK J. GLEASON, OF WALPOLE, MASSACHUSETTS.

BRAKE-LINING.

1,342,043.	Specification of Letters Patent.	Patented June 1, 1920.

Application filed August 1, 1918. Serial No. 247,759.

*To all whom it may concern:*

Be it known that I, FREDERICK J. GLEASON, a citizen of the United States, and resident of Walpole, county of Norfolk, Commonwealth of Massachusetts, have invented an improvement in Brake-Linings, of which the following description, in connection with the accompanying drawings, is a specification, like characters on the drawings representing like parts in each of the several views.

This invention relates to brake linings woven of textile or other material and impregnated with composition suitable for giving a proper co-efficient of friction, rendering the lining water-proof and largely fire-proof, etc. Woven brake linings of this character have heretofore been either of a relatively coarse and rough weave, or they have been made of a relatively fine weave and built up of successive layers of such finer weave folded and stitched together. The coarse woven type of lining has had the advantage that oil, dirt or grit and other foreign matter can work up into the interstices, while this type has had the objection that it tends to become loose with a separation of the layers, *i. e.*, it tends to "crawl." The relatively fine woven folded and stitched type of lining on the other hand involves a selvage edge to keep the same from fraying out and there is a tendency to a relative shifting of the series of layers of which this is built up, this type however having the advantage of holding the rivets more securely and with less tendency to displacement on the brake band. The prime object of the present invention is to provide an improved composite or built up type of brake lining embodying the advantages of both of the above mentioned types of lining and doing away with the disadvantages of each. To this end I provide a lining composed of an inner layer of relatively coarse or rough woven fabric and secure the same preferably by vulcanization and also if desired by stitching or the like to an outer lining portion composed of folded layers of relatively fine woven fabric. The foregoing and other objects and advantages of the invention will more fully appear from the following detailed description, and the distinctive features of novelty will be pointed out in the appended claims.

Referring to the drawings:

Figure 1 is a plan view with a part broken away showing a portion of a brake lining constructed in accordance with my invention;

Fig. 2 is an edge view;

Fig. 3 is a transverse section on line 3—3 of Fig. 1;

Fig. 4 is an enlarged transverse section on line 4—4 of Fig. 1; and

Fig. 5 is a perspective view showing a part of a brake with a lining made in accordance with my invention.

In the practice of my invention I provide an inner layer of relatively coarse or rough woven fabric 10 impregnated with suitable material for obtaining the proper friction co-efficient and rendering the lining substantially water-proof and fire-proof. To this inner layer I secure one or more layers of relatively fine woven fabric 11, three of such layers 11$^a$ being shown as folded and stitched together to make this backing portion of the lining, and stitched together at their edges as seen at 11$^b$. These lining portions comprising the inner coarse woven fabric 10 and the series of fine woven folded layers 11 are then secured together either by vulcanizing or by stitching 12 or both, it being noted that the impregnating composition employed is usually of a more or less rubber like nature capable of vulcanization to bring it to a proper condition for use, and advantage may be taken of this fact to unite the inner and outer lining layers into a unitary mass by having them held pressed together in the vulcanizing operation. In use the present lining is applied as usual as seen at 13 to a brake band 14 by rivets or the like 15, and these passing through the relatively fine woven backing layers 11 will hold the lining secure against shifting or crawling, while the inner coarse woven fabric layer 10 will receive into its interstices foreign particles of grit, as well as holding oil, and is thus most effective for its purpose, as well as being much more durable in use. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. A brake lining built up of an inner layer of relatively coarse woven fabric presenting relatively large surface areas of open interstices, and a backing secured thereto of relatively fine woven fabric.

2. A brake lining built up of an inner layer of relatively coarse woven fabric presenting relatively large surface areas of open interstices, and an outer backing secured thereto composed of a series of folded layers of relatively fine woven fabric.

3. A brake lining, composed of a relatively coarse woven impregnated inner layer, and a series of relatively fine woven layers secured thereto as a backing impregnated with a vulcanizing substance, said substance serving also as a binder to unite said inner and backing layers together.

4. A brake lining, composed of an inner layer of relatively coarse woven fabric presenting relatively large surface areas of open interstices, and an outer backing secured thereto composed of a plurality of layers of relatively fine woven fabric.

5. A brake lining, composed of an inner layer of relatively coarse woven fabric presenting relatively large surface areas of open interstices, and an outer backing secured thereto composed of a plurality of layers of relatively fine woven fabric, said inner layer and outer backing secured together by a vulcanizing binder.

In testimony whereof I have signed my name to this specification.

FREDERICK J. GLEASON.